(12) United States Patent
Arias Chao et al.

(10) Patent No.: US 9,752,504 B2
(45) Date of Patent: Sep. 5, 2017

(54) METHOD FOR OPERATING A GAS TURBINE PLANT AND GAS TURBINE PLANT FOR IMPLEMENTING THE METHOD

(75) Inventors: Manuel Arias Chao, Zürich (CH); Bernhard Wippel, Wettingen (CH); Christian Balmer, Wettingen (CH); Ralf Jakoby, Mülligen (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 1102 days.

(21) Appl. No.: 13/589,494

(22) Filed: Aug. 20, 2012

(65) Prior Publication Data
US 2013/0067928 A1  Mar. 21, 2013

(30) Foreign Application Priority Data
Aug. 22, 2011 (EP) .................................. 11178309

(51) Int. Cl.
*F02C 7/18* (2006.01)
*F01D 15/12* (2006.01)
(Continued)

(52) U.S. Cl.
CPC .............. *F02C 7/185* (2013.01); *F01D 15/12* (2013.01); *F02C 6/08* (2013.01); *F02C 7/18* (2013.01); *F02C 9/18* (2013.01); *F05D 2260/20* (2013.01)

(58) Field of Classification Search
CPC .... F02C 7/18; F02C 7/185; F02C 9/18; F02C 9/52; F02C 6/08; F05D 2270/303
See application file for complete search history.

(56) References Cited

U.S. PATENT DOCUMENTS

| 4,167,096 A | 9/1979 | Smith et al. |
| 4,767,259 A * | 8/1988 | Kurosawa ............... F01P 7/026 415/17 |

(Continued)

FOREIGN PATENT DOCUMENTS

| CN | 101581252 A | 11/2009 |
| CN | 101881222 A | 11/2010 |

(Continued)

OTHER PUBLICATIONS

European Search Report issued on May 15, 2012, by the European Patent Office in corresponding European Patent Application No. 11178309.8-2321. (7 pages).

(Continued)

*Primary Examiner* — William H Rodriguez
(74) *Attorney, Agent, or Firm* — Buchanan Ingersoll & Rooney PC

(57) ABSTRACT

A method is provided for operating a gas turbine plant including a compressor, which on an inlet side inducts intake air and compresses it, providing compressor exit air on a discharge side. The plant also includes a combustion chamber where fuel is combusted, using compressor exit air, forming a hot gas; and a turbine, where the hot gas is expanded, performing work. The method includes extracting compressed air from the compressor, directing it as cooling air flow into the combustion chamber and/or into the turbine for cooling thermally loaded components. The method also includes controlling at least one cooling air flow, for achieving specific operating targets, using a control element depending on an operating target. A gas turbine plant is also provided having at least one control element for cooling air flow control, and a gas turbine controller which controls the gas turbine plant based on selectable control parameter sets.

15 Claims, 1 Drawing Sheet

(51) Int. Cl.
*F02C 6/08* (2006.01)
*F02C 9/18* (2006.01)

(56) References Cited

U.S. PATENT DOCUMENTS

| | | | |
|---|---|---|---|
| 5,581,996 A * | 12/1996 | Koch | F01D 5/141 |
| | | | 60/266 |
| 5,622,042 A * | 4/1997 | Mirsky | F02C 9/00 |
| | | | 60/39.281 |
| 5,634,327 A | 6/1997 | Kamber et al. | |
| 6,416,279 B1 | 7/2002 | Weigand et al. | |
| 6,523,346 B1 | 2/2003 | Hoffmann et al. | |
| 6,615,574 B1 | 9/2003 | Marks | |
| 8,096,747 B2 | 1/2012 | Sengar et al. | |
| 8,240,153 B2 | 8/2012 | Childers et al. | |
| 8,355,854 B2 | 1/2013 | Childers | |
| 2005/0022535 A1 * | 2/2005 | Palmisano | F01D 25/12 |
| | | | 60/772 |
| 2009/0056342 A1 * | 3/2009 | Kirzhner | F01D 25/12 |
| | | | 60/772 |
| 2009/0277184 A1 * | 11/2009 | Sengar | F02C 6/08 |
| | | | 60/775 |
| 2010/0154434 A1 | 6/2010 | Kubota et al. | |
| 2010/0175387 A1 | 7/2010 | Foust et al. | |
| 2010/0286889 A1 | 11/2010 | Childers | |
| 2011/0135456 A1 * | 6/2011 | Takahashi | F01D 11/24 |
| | | | 415/180 |
| 2012/0117977 A1 | 5/2012 | Childers et al. | |
| 2013/0164115 A1 * | 6/2013 | Sennoun | F02C 7/185 |
| | | | 415/1 |
| 2014/0126991 A1 * | 5/2014 | Ekanayake | F02C 7/143 |
| | | | 415/1 |
| 2015/0059355 A1 * | 3/2015 | Feigl | F02C 7/18 |
| | | | 60/782 |

FOREIGN PATENT DOCUMENTS

| | | |
|---|---|---|
| DE | 102009003408 A1 | 8/2009 |
| EP | 0620363 A1 | 10/1994 |
| EP | 0718470 A1 | 6/1996 |
| EP | 1028230 A1 | 8/2000 |
| EP | 1967717 A1 | 9/2008 |
| JP | 05-044494 A | 2/1993 |
| JP | 044494 A | 2/1993 |
| JP | 07-054669 A | 2/1995 |
| JP | 054669 A | 2/1995 |
| RU | 2 044 906 C1 | 9/1995 |
| RU | 2 146 769 C1 | 3/2000 |
| WO | 2008/123904 A2 | 10/2008 |

OTHER PUBLICATIONS

Office Action (Decision of Grant) issued on Dec. 1, 2014, by the Russian Patent Office in corresponding Russian Patent Application No. 2012136111/06(058521), and an English Translation of the Office Action. (13 pages).

Office Action issued on Jun. 3, 2014, by the Russian Patent Office in corresponding Russian Patent Application No. 2012136111/06(058521) and an English Translation of the Office Action. (10 pages).

Office Action (First Office Action) issued on Feb. 4, 2015, by the State Intellectual Property Office, P.R. China in corresponding Chinese Patent Application No. 201210375046.2, and an English Translation of the Office Action. (27 pages).

* cited by examiner

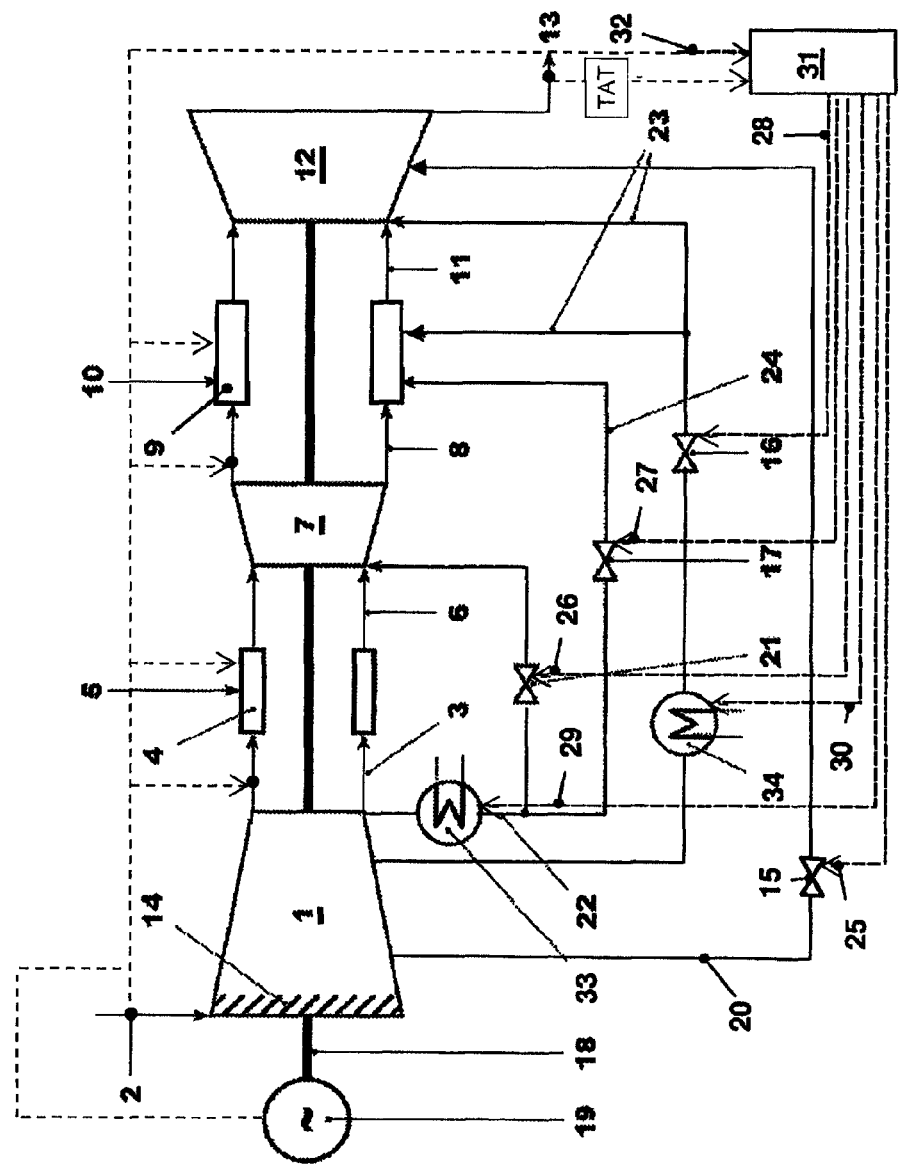

METHOD FOR OPERATING A GAS TURBINE PLANT AND GAS TURBINE PLANT FOR IMPLEMENTING THE METHOD

CROSS REFERENCE TO RELATED APPLICATIONS

This application claims benefit under 35 USC §119 to European Patent Application No. 11178309.8, filed Aug. 22, 2011, the entire contents of which are incorporated herein by reference as if fully set forth.

FIELD OF THE INVENTION

The present invention relates to the field of gas turbines. It refers to a method for operating a gas turbine, in which compressed air is extracted from a compressor and is used as cooling flow for cooling thermally loaded components, and also refers to a gas turbine plant for implementing the method.

BACKGROUND OF THE INVENTION

For cooling the hot parts, especially the combustion chamber and the turbine through which flows the hot gas, gas turbines (gas turbine plants) typically use cooling fluids which are extracted from the compressor at a suitable pressure, sometimes recooled, and after cooling of the hot parts has been carried out are added to the turbine flow. In this case, the cooling of the thermally highly loaded components of a gas turbine is conventionally carried out according to a fixed scheme. In the simplest case, the cooling air proportion remains largely constant over wide operating ranges. This is also when a machine is operated in partial load operation with reduced hot gas temperatures, for example.

In order to vary and to control the volume of cooling air in proportion to the actual circumstances and to the operating conditions, EP 1028230 proposes to realize controlling of the material temperature of the cooled components by means of a variable cooling air supply. For this, it was proposed to equip thermally loaded components with thermoelements or other devices for temperature measurement. If the measured temperature exceeds a predetermined reference value, the volume of cooling air is increased. Vice versa, the cooling air is additionally restricted if the measured material temperature falls short of the predetermined reference value.

U.S. Pat. No. 6,615,574 deals with another problem. In order to realize a flexible supply with matching feed pressure, it is proposed to branch the compressed air from different stages of the compressor and to mix it in a controlled manner so that the volume of cooling air which is necessary for cooling is provided at an adequate feed pressure.

Furthermore, the use of a controllable secondary air system for increasing the hot gas temperature during partial load operation is known from EP1967717.

Specific adjustments of the cooling air flows for operation according to a predetermined operating concept are therefore known from the prior art. These, however, have little flexibility and do not allow any change of the operating concept as a function of operating targets.

SUMMARY

The present disclosure is directed to a method for operating a gas turbine plant. The plant includes a compressor, which on an inlet side inducts intake air and compresses it for providing compressor exit air on a discharge side. The plant also includes a combustion chamber in which a fuel is combusted, using the compressor exit air, forming a hot gas; and a turbine, in which the hot gas is expanded, performing work. The method includes extracting compressed air from the compressor and directing the compressed air as cooling air flow into the combustion chamber and/or into the turbine for cooling thermally loaded components. The method also includes controlling at least one cooling air flow, for achieving specific operating targets, with a control element in dependence upon the operating target.

The present disclosure is also directed to a gas turbine plant including a compressor, which on an inlet side inducts intake air and compresses it for providing compressor exit air on a discharge side. The plant also includes a combustion chamber, in which a fuel is combusted, using the compressor exit air, forming hot gas and a turbine in which the hot gas is expanded, performing work. In the plant, for cooling thermally loaded components of the combustion chamber and/or of the turbine a cooling air flow is directed from the compressor and/or from the exit of the compressor to the thermally loaded components, and at least one control element for controlling the cooling air flow, and a gas turbine controller, in which the control parameters for realizing a conventional operating concept are stored. At least one additional set of control parameters, which can be selected by an operator for realizing a specific operating concept, is stored in the gas turbine controller.

BRIEF DESCRIPTION OF THE DRAWING

A preferred embodiment of the invention is described in the following text with reference to a drawing which serves purely for explanation and is not be considered as being limiting.

FIG. 1 shows a greatly simplified schematic layout of a gas turbine plant according to an exemplary embodiment of the invention.

DETAILED DESCRIPTION OF THE PREFERRED EMBODIMENTS

Introduction

It is therefore the object of the invention to disclose an operating concept for a gas turbine plant and also a gas turbine plant for implementing the method, which avoids the disadvantages of known methods or of gas turbine plants and particularly to enable an operation of the gas turbine which is adapted to the operating targets by means of a flexible adjustment of the cooling air system.

One aspect of the invention is to control a cooling air mass flow for achieving specific operating targets using a control element in dependence upon the operating target.

To this end, in a method for operating a gas turbine plant—which comprises a compressor, which on the inlet side inducts intake air and compresses it for providing compressor exit air on the discharge side, a combustion chamber, in which a fuel is combusted, using the compressor exit air, forming hot gas, and also a turbine, in which the hot gas is expanded, performing work—compressor exit air, which is extracted from the compressor and controlled, is directed as a cooling air flow into the combustion chamber and/or into the turbine for cooling thermally loaded components. In the method, the controlling of the cooling air flow is not carried out in accordance with a fixed scheme but the cooling air flow, for achieving specific operating targets, is controlled using a control element in dependence upon the operating target.

Furthermore, one embodiment allows different operating targets to be selected in the controlling of the gas turbine plant. Two or more sets of target values are typically stored, and are selectable, in the controller for controlling purposes.

Operating targets, to which the controlling of the cooling air flows is adapted, comprise a service life-increased operation, a low-emissions low partial load operation with increased cooling air flow in order to increase the hot gas temperature at low mixing temperature, an operation with controlled or limited compressor exit pressure, an operation in a combined cycle power plant with heat recovery boiler, in which the turbine exhaust temperature is kept high for good inlet conditions into a heat recovery boiler at low partial load, and a partial load operation with controlled turbine exhaust temperature.

For example, in one embodiment of the method for increasing the service life relative to a standard operating concept, the turbine inlet temperature (TIT) or hot gas temperature in the combustion chamber is reduced and at the same time at least one cooling air flow is increased. This combination has two advantages. Firstly, the cooling, and consequently the service life, are increased by increasing the cooling air flow. Secondly, an excessively sharp reduction of the hot gas temperature, as would be necessary without changing the cooling air flow volume for achieving the same service life increase, can be avoided. As a result of the increased cooling air flow, the turbine inlet mass flow is reduced. This leads to a reduced pressure ratio across the turbine and consequently also to a reduced temperature ratio. The resulting drop of the exhaust gas temperature is reduced as a result of this combination compared with a simple reduction of the hot gas temperature. This minimizes the negative effects on the part of a downstream heat recovery boiler and furthermore allows an operation with high overall efficiency.

As the turbine inlet temperature, for example the so-called mixing temperature according to ISO 2314 (1989), which describes a theoretical temperature which would be obtained during the mixing of the hot gases with all mass flows which are fed into the combustion chamber and turbine before expansion, or the rotor inlet temperature according to ANSI B133.1/1978, or the "rated firing temperature" according to API 616/1992, can be used.

According to a further embodiment of the method for increasing the service life, the TIT in the combustion chamber is reduced relative to a standard operating concept, at the same time at least one high-pressure cooling air flow is increased, and a low-pressure cooling air flow is kept unchanged or reduced. This specific embodiment avoids unnecessary cooling air consumption in the rear stages of the turbine. As a result of the TIT reduction and increased cooling air feed in the high-pressure system, the hot gas temperature in the region of the components which are cooled with low-pressure cooling air is already reduced to such an extent that additional cooling practically leads to no service life increase. To the contrary, a reduction of the low-pressure cooling air mass flow can be realized without detriment to the service life. The restricted cooling air remains in the main flow, is heated in the combustion chamber to the reduced hot gas temperature and can thus perform work and therefore increase power and efficiency.

In a further embodiment of the method, a cooling air flow is controlled as a function of the compressor exit pressure. In particular, at low temperatures the compressor intake mass flow increases and the compressor exit pressure along with it. Ambient temperatures of below minus 15° C., for example, are seen as being low temperatures. Depending upon the optimizing aim, a gas turbine, however, can be designed so that temperatures of below 0° C., or temperatures at which a risk of icing of the compressor exists, i.e. typically below about 7° C., are already seen as being low temperatures. The compressor exit pressure in this case can rise above the design pressure of the gas turbine, especially the design pressure of casing or of cooling air coolers. In order to avoid an elaborate and expensive design for extremely high pressures or to avoid a pressure reduction as a result of partial load operation according to a conventional operating concept, i.e. TIT reduction and closing of compressor inlet guide vanes, according to the proposed embodiment of the method, the cooling air is increased after a limit value of the compressor exit pressure in order to reduce said compressor exit pressure. In particular, the compressor exit pressure is kept at the limit value by controlling at least one cooling air flow.

According to a further embodiment of the method, at low partial load a cooling air mass flow is controlled as a function of the turbine exhaust temperature (TAT) in order to keep the TAT at a high level.

Starting from full load, partial load of a gas turbine is conventionally achieved by the TIT first being reduced to a partial load limit value. The at least one row of compressor variable inlet guide vanes is then closed. With the closing of the row of compressor variable inlet guide vanes, the mass flow falls and consequently the pressure ratio across the turbine. This first of all leads to an increase of the TAT. As soon as this has reached a partial load limit value, the TIT is reduced. The opening of the rows of compressor variable inlet guide vanes and hot gas temperatures are then further reduced until the row of compressor variable inlet guide vanes is closed at a partial load limit value. A further load reduction is conventionally realized by a further reduction of the hot gas temperature alone, which leads directly to a reduction of the TAT. In order to be able to realize a good overall efficiency in a power plant with a downstream heat recovery boiler, the TAT must be kept at a minimum value. This minimum value, during very low partial load, is fallen short of according to a conventional running concept so that an economical operation is hardly possible. The low partial load operation typically lies below 40% relative load, i.e. load in relation to the full load output. Depending upon design, the low partial load range can conventionally lie below 25% relative load. A running concept in which the mass flows in the cooling air system are not controlled is referred to as a conventional running concept in this case. The output is reduced from full load by closing the compressor variable inlet guide vanes and by reducing the hot gas temperature. In the high load range, the hot gas temperature is typically reduced from a full load value to a partial load value (optional). The compressor variable inlet guide vanes are then closed until a TAT limit is reached. As soon as this is reached, the hot gas temperature is reduced in parallel to the closing of the compressor variable inlet guide vanes and controlled so that the TAT remains at the TAT limit. As soon as the compressor variable inlet guide vanes have reached a closed position (minimum position for the load operation), the load is controlled only via the hot gas temperature. A hot gas temperature reduction thus leads directly to a reduction of the TAT and conventionally therefore quickly leads to a low TAT and to the above-described problems for a downstream water-steam process. Loading up is carried out in the reverse sequence.

The proposed embodiment of the method allows the TAT to be increased by a reduction of the cooling air consumption. In particular, controlling of the intermediate-pressure cooling air flow and/or a low-pressure cooling air flow leads directly to a TAT increase at low partial load without detriment to service life. Since the hot gas temperature and TAT are already greatly reduced, there is practically no requirement for cooling. An intermediate-pressure cooling air flow and/or a low-pressure cooling air flow can be restricted to a great extent. A low-pressure cooling air flow can even be completely shut off in the extreme. A minimum flow, however, is typically maintained for purging and in order to avoid backflows.

In addition to the method, a gas turbine plant, which is suitable for implementing the method, is a subject of the invention. Such a gas turbine plant comprises at least one compressor, which on the inlet side inducts intake air and compresses it for providing compressor exit air on the discharge side, at least one combustion chamber, in which a fuel is combusted, using the compressor exit air, forming hot gas, and also at least one turbine, in which the hot gas is expanded, performing work. For cooling thermally loaded components of the combustion chamber and/or of the turbine, provision is made for first cooling lines from an extraction point of the compressor and/or from the exit of the compressor to the thermally load components. Furthermore, in the first cooling lines from the compressor extraction point and/or from the exit of the compressor to the thermally loaded components, the gas turbine according to the invention comprises at least one control element for controlling the cooling air mass flow to the thermally loaded components, and also a gas turbine controller. According to the invention, at least one additional set of control parameters, which an operator can select for realizing a specific running concept, is stored in the controller.

In order to ensure a minimum cooling air flow to the thermally loaded components, according to one embodiment the control element has a minimum opening. The control element can, for example, be configured so that closing in the throughflow direction is mechanically not possible. In particular, the minimum cooling air flow prevents a backflow into the cooling air system. Cooled turbine blades typically consist of high temperature-resistant materials. The supply line systems and, for example, blade carriers or casings through which these supply lines lead, are typically produced from different materials to the turbine blades. These are usually not resistant to high temperature so that a backflow of hot gases into these parts is to be prevented, if even the hot gas temperature has dropped below a temperature which is permissible for the thermally loaded components which are actually to be cooled.

According to one embodiment, the control element for controlling the cooling air flow has a minimum opening which ensures a throughflow capacity of at least 10% of the throughflow capacity at full load in order to prevent a hot gas incursion.

Conventionally, cooling air openings of thermally loaded components are designed for full load operation since this is the operating state which is critical to service life. In contrast to a conventional construction, the gas turbine plant according to one embodiment comprises at least one thermally loaded component with cooling air openings of which the throughflow capacity is greater than is required for the design point at full load. This allows the cooling air flow to be controlled in a wide range in dependence upon the operating behavior.

According to one embodiment, the cooling air openings of a thermally loaded component have a throughflow capacity which is at least 30% greater than the throughflow capacity which is required for achieving the design service life at the design point at full load.

According to a further embodiment, the cooling air openings of a thermally loaded component have a throughflow capacity which is at least 50% greater than the throughflow capacity which is required for the reliable operation at the design point at full load.

The cooling effect of the cooling air and its effect upon the gas turbine process are determined not only by the cooling air mass flows but also by the temperature to which this is recooled in recoolers. In one embodiment of the method, the recooling temperature is therefore additionally controlled in dependence upon the operating targets or upon the cooling air mass flow.

In a specific embodiment, the recooling temperature is increased with increasing cooling air mass flow. This temperature increase can be selected in this case so that the service life consumption in unaffected on account of the increased cooling air flows.

In a further embodiment, the recooling temperature is reduced with increasing cooling air mass flow. A reduction of the recooling temperature with simultaneous mass flow reduction can be realized at low partial load for the intermediate-pressure section, without detriment to service life, for TAT controlling, for example.

In a further embodiment, the recooling temperature is reduced at partial load in order to increase the hot gas temperature at a TIT given for a load point, for example.

The described embodiments of the invention with a gas turbine with one combustion chamber serve purely for explanation and are not to be considered as being limiting. For example, the invention is also applicable to gas turbines with two or more combustion chambers and/or turbines, as are known for example from EP0620363 B1 or from EP0718470 A2, and is described in the subsequent exemplary embodiment.

Furthermore, the method is advantageous for the optimization of particular types of operation. For example, in the case of the operation of a gas turbine with high fogging, i.e. water injection into the compressor for power augmentation, the pressure build-up in the compressor can be shifted compared with a design for a dry operation. The pressure build-up is typically shifted towards the compressor exit as a result of the cooling effect of the injected water during the high fogging operation. As a result, the pressures during a low-pressure cooling air extraction and an intermediate-pressure cooling air extraction drop relative to the compressor exit pressure. The pressure in the hot gas path is proportional; however, to the compressor exit pressure so that the pressure difference which is available in the low-pressure cooling air system and intermediate-pressure cooling air system is reduced during the high fogging operation. Controlling can be adapted to the high fogging operation so that the changes in the pressures in relation to the compressor exit pressure during a low-pressure extraction or intermediate-pressure extraction are compensated by control elements in the cooling air lines.

DETAILED DESCRIPTION

FIG. 1 shows a gas turbine with sequential combustion for implementing the method according to the invention. It comprises a compressor 1, a first combustion chamber 4, a first turbine 7, a second combustion chamber 9 and a second turbine 12. It typically comprises a generator 19 which at the cold end of the gas turbine, that is to say at the compressor 1, is coupled to a shaft 18 of the gas turbine.

A fuel, which is gas or oil, is introduced via a fuel feed line 5 into the first combustion chamber 4, mixed with air which is compressed in the compressor 1, and combusted. The hot gases 6 are partially expanded in the subsequent first turbine 7, delivering work.

As soon as the second combustion chamber is in operation, additional fuel is added via a fuel feed line 10 to the partially expanded gases 8 in burners of the second combustion chamber 9 and combusted in the second combustion chamber 9. The combustion chambers 9 are formed as annular combustion chambers, for example. The hot gases 11 are expanded in the subsequent second turbine 12, delivering work. The exhaust gases 13 can be fed to a heat recovery boiler of a combined cycle power plant or to another waste heat user with profitable effect.

For controlling the intake mass flow, the compressor 1 has at least one row 14 of compressor variable inlet guide vanes.

Some of the compressed air 3 is branched off as high-pressure cooling air 22, recooled via a high-pressure cooling-air cooler 33 and fed as cooling air 22 to the first combustion chamber 4 (cooling air line not shown) and to the first turbine. The mass flow of the high-pressure cooling air 22 which is fed to the high-pressure turbine 7 can be controlled in the example by means of a high-pressure cooling-air control valve 21.

Some of the high-pressure cooling air 22 is fed as so-called carrier air 24 to the burner lances and used for cooling the burner lances and/or for assisting the introduction and mixing of the fuel in the burners. The mass flow of the carrier air 24 can be controlled by means of a carrier-air control valve 17.

Some of the air, partially compressed, is branched from the compressor 1, recooled via a low-pressure cooling-air cooler 34 and fed to the second combustion chamber 9 and to the second turbine as intermediate-pressure cooling air 23. The mass flow of the intermediate-pressure cooling air 23 can be controlled in the example by means of an intermediate-pressure cooling-air control valve 16.

Furthermore, some of the air, partially compressed, is branched from the compressor 1 as low-pressure cooling air 20 and fed to the second turbine 12. The mass flow of the low-pressure cooling air 20 can be controlled in the example by means of a low-pressure cooling-air control valve 15.

The gas turbine plant also comprises a controller 31 which for controlling purposes is connected via conventional control lines 32 to the gas turbine and is connected via control lines (25, . . . , 30) to the control element of the cooling air system. The conventional control lines, which within the scope of the invention for implementing the method according to the invention are worth mentioning, comprise measurement lines for transmitting important process variables to the gas turbine, especially for measuring the turbine exhaust temperature of the first turbine 7 and of the second turbine 12, the compressor exit pressure, the combustion chamber pressures, the temperature of the intake air 2 and of the compressor exit air 3, the position of the compressor variable inlet guide vanes 14, and also the terminal power of the generator 19. Furthermore, they comprise control lines for controlling fuel control valves for controlling the fuel feed 5, 10 and also control lines for controlling the compressor variable inlet guide vanes 14.

For controlling the cooling air temperatures, the controller 31 is connected to the cooling-air cooler 33, 34 by means of a control line 30 to the intermediate-pressure cooling-air cooler 34 and by means of a control line 29 to the high-pressure cooling-air cooler 33. For controlling the cooling air flows, the controller 31 is connected to the low-pressure cooling-air control valve 15 by means of a control line 25, to the intermediate-pressure cooling-air control valve 16 by means of a control line 28, and to the high-pressure cooling-air control valve 21 by means of a control line to the high-pressure cooling-air control valve 26. For controlling the carrier air flow 24, the controller 31 is also connected to the carrier-air control valve 17.

Stored in the controller 31, in addition to the control parameters for a standard operating concept, is at least one set of control parameters for a specific operating concept which deviates from the standard concept and which the operator can select via a human-machine interface, such as the control room or an "operator interface". This control parameter set includes, for example, amended target values for hot gas temperatures, cooling air flows, cooling air recooling temperatures, and TAT. These control parameters can be stored in the form of tables or as functions.

LIST OF DESIGNATIONS

1 Compressor
2 Intake air
3 Compressor exit air
4 First combustion chamber
5 Fuel feed line
6 Hot gases
7 First turbine
8 Partially expanded hot gases
9 Second combustion chamber
10 Fuel feed line
11 Hot gases
12 Second turbine
13 Exhaust gases (to the heat recovery boiler)
14 Compressor variable inlet guide vanes
15 Low-pressure cooling-air control valve
16 Intermediate-pressure cooling-air control valve
17 Carrier-air control valve
18 Shaft
19 Generator
20 Low-pressure cooling air
21 High-pressure cooling-air control valve
22 High-pressure cooling air
23 Intermediate-pressure cooling air
24 Carrier air
25 Control line to the low-pressure cooling-air control valve
26 Control line to the high-pressure cooling-air control valve
27 Control line to the carrier-air control valve
28 Control line to the intermediate-pressure cooling-air control valve
29 Control line to the high-pressure cooling-air cooler
30 Control line to the intermediate-pressure cooling-air cooler
31 Gas turbine controller
32 Control and measurement lines to the gas turbine
33 High-pressure cooling-air cooler
34 Intermediate-pressure cooling-air cooler
TAT Turbine exhaust temperature
TIT Turbine inlet temperature

What is claimed is:

1. A method for operating a gas turbine plant, comprising a compressor, which on an inlet side inducts intake air through variable inlet guide vanes and compresses it for providing compressor exit air on a discharge side, a combustion chamber, in which a fuel is combusted, using the compressor exit air, forming a hot gas, and a turbine, in which the hot gas is expanded, performing work, the method comprising:
- closing the variable inlet guide vanes to a minimum position during a low partial load operation;
- extracting compressed air from the compressor and directing the compressed air as cooling air flow into the combustion chamber and/or into the turbine for cooling thermally loaded components; and
- controlling an intermediate-pressure cooling air flow and/or a low-pressure cooling air flow during the low partial load operation for cooling thermally loaded components in the combustion chamber and/or in the turbine as a function of the turbine exhaust temperature to maintain turbine exhaust temperature above a turbine exhaust temperature (TAT) limit and as a function of inlet conditions into a heat recovery boiler.

2. The method as claimed in claim 1, wherein the cooling air flow for cooling thermally loaded components of the combustion chamber and/or of the turbine is also controlled as a function of the compressor exit pressure.

3. The method as claimed in claim 2, wherein at low ambient temperature the cooling air flow for cooling thermally loaded components of the combustion chamber and/or of the turbine is increased in order to reduce the compressor exit pressure.

4. The method as claimed in claim 1, wherein at low partial load the intermediate-pressure cooling air flow and/or the low-pressure cooling air flow for cooling thermally loaded components of the combustion chamber and/or of the turbine is reduced as a function of the turbine exhaust temperature (TAT) in order to keep the turbine exhaust temperature (TAT) constant.

5. The method as claimed in claim 4, wherein regardless of the turbine exhaust temperature (TAT) the intermediate-pressure cooling air flow and/or the low-pressure cooling air flow is not reduced below a minimum flow.

6. The method as claimed in claim 1, wherein regardless of the turbine exhaust temperature (TAT) the intermediate-pressure cooling air flow and/or the low-pressure cooling air flow is not reduced below a minimum flow.

7. The method as claimed in claim 1, wherein a recooling temperature of a recooler, in which the cooling air flow is recooled, is controlled in dependence upon a cooling air flow.

8. The method as claimed in claim 1, wherein the turbine exhaust temperature (TAT) is kept above a turbine exhaust temperature limit during a partial load operation at less than 40% of full load.

9. The method as claimed in claim 8, wherein the turbine exhaust temperature (TAT) is kept above a turbine exhaust temperature limit during a partial load operation at less than 25% of full load.

10. The method as claimed in claim 1, wherein the cooling air consumption during a partial load operation is reduced relative to cooling air consumption at full load for maintaining the turbine exhaust temperature (TAT) above the turbine exhaust temperature (TAT) limit.

11. The method as claimed in claim 1, wherein the extracted compressed air is directed into the combustion chamber and the turbine, and wherein a gas turbine controller is configured to control the intermediate-pressure cooling air flow and/or the low pressure cooling air flow for cooling thermally loaded components in the combustion chamber and in the turbine as a function of the turbine exhaust temperature (TAT) in order to keep the turbine exhaust temperature (TAT) above the turbine exhaust temperature (TAT) limit.

12. A gas turbine plant comprising a compressor, which on an inlet side inducts intake air through variable inlet guide vanes and compresses it for providing compressor exit air on a discharge side, a combustion chamber, in which a fuel is combusted, using the compressor exit air, forming hot gas, a turbine, in which the hot gas is expanded, performing work, wherein for cooling thermally loaded components of the combustion chamber and/or of the turbine a cooling air flow is directed from the compressor and/or from the exit of the compressor to the thermally loaded components, and at least one control element for controlling the cooling air flow, and a gas turbine controller, in which the control parameters for realizing a conventional operating concept are stored, and at least one additional set of control parameters, which is selected by an operator for realizing a specific operating concept, is stored in the gas turbine controller; wherein the gas turbine controller is configured to close the variable inlet guide vanes during a low partial load operation to a minimum position and to control an intermediate-pressure cooling air flow and/or a low pressure cooling air flow during the low partial load operation for cooling thermally loaded components in the combustion chamber and/or in the turbine as a function of the turbine exhaust temperature (TAT) in order to keep the turbine exhaust temperature (TAT) above a turbine exhaust temperature (TAT) limit and as a function of inlet conditions into a heat recovery boiler.

13. The gas turbine plant as claimed in claim 12, wherein at least one control element has a minimum opening which ensures a minimum cooling air flow to the thermally loaded components.

14. The gas turbine plant as claimed in claim 13, wherein at least one thermally loaded component comprises cooling air openings having a throughflow capacity which is at least 30% greater than a throughflow capacity which is required for achieving a design service life at a design point at full load.

15. The gas turbine plant as claimed in claim 12, wherein at least one thermally loaded component comprises cooling air openings having a throughflow capacity which is at least 30% greater than a throughflow capacity which is required for achieving a design service life at a design point at full load.

* * * * *